United States Patent [19]

Rice et al.

[11] 3,954,940

[45] May 4, 1976

[54] PROCESS FOR SURFACE WORK STRAIN RELIEF OF ELECTROOPTIC CRYSTALS

[75] Inventors: Robert R. Rice; Louis B. Allen, Jr.; Gordon H. Burkhart, all of St. Louis; Herbert G. Koenig, Jr., St. Charles, all of Mo.

[73] Assignee: McDonnell Douglas Corporation, St. Louis, Mo.

[22] Filed: Nov. 4, 1974

[21] Appl. No.: 520,231

[52] U.S. Cl. .................................. 423/312; 156/16; 156/17; 350/160 R; 350/150; 423/593
[51] Int. Cl.² ................................................ G02B 5/20
[58] Field of Search ............... 156/17, 345, 6, 8, 16; 252/79.3; 332/7.51; 154/16, 24; 360/160, 150; 423/62, 312, 593

[56] References Cited
UNITED STATES PATENTS

| | | | |
|---|---|---|---|
| 3,404,049 | 10/1968 | Shanefield et al. | 156/6 |
| 3,421,962 | 1/1969 | Topas | 156/16 |
| 3,528,765 | 9/1970 | Fay et al. | 423/593 |
| 3,841,930 | 10/1974 | Hetrich | 156/345 |
| 3,860,467 | 1/1975 | Lim | 156/17 |

OTHER PUBLICATIONS

"Better Laser Modulation Sought," Electronic Design 22 (Sept. 27, 1966), pp. 51–55.

Primary Examiner—William A. Powell
Assistant Examiner—Jerome W. Massie
Attorney, Agent, or Firm—Charles B. Haverstock

[57] ABSTRACT

An electrooptic crystal having improved characteristics including an improved light extinction ratio and a process of making same including etching certain portions of the lateral surfaces thereof so as to relieve surface and other strain in the crystal.

29 Claims, 5 Drawing Figures

PROCESS FOR SURFACE WORK STRAIN RELIEF OF ELECTROOPTIC CRYSTALS

Prior art electrooptic modulator crystals, insofar as known, exhibit substantial undesirable surface work strain which has adversely affected certain operating characteristics and has limited their usefulness. Surface work strain, which is primarily a result of strain birefringence, tends to adversely affect the light extinction ratio of the crystal when it is operated in an optical device such as an optical modulator or demodulator. In electrooptic crystals suitable for use in broadband, small aperture, high speed configurations, surface work strain creates particularly serious problems because the crystals suitable for these purposes are usually made to be relatively long and thin so as to be capable of operating at comparatively low level driver voltages. Because of the size requirements, prior art crystals useful in such configurations rarely achieve extinction ratios greater than about 20 decibels. Since the extinction ratio is a measure of the ability of the electrooptic crystal to end or terminate a pulse at a precise instant, and since this is an extremely important characteristic especially at high data rates, the need for crystals with improved extinction ratios is well recognized. Crystals having improved extinction ratios and a method of producing same are disclosed herein.

Accordingly, it is a principal object of the present invention to provide improved electrooptic crystals wherein crystal strain and particularly surface work strain is substantially relieved.

Another object is to teach the construction of electrooptic crystals having improved extinction ratios.

Another object is to provide improved electrooptic crystals for optical communication systems and the like that are capable of operating at high data rates, including data rates measured in the hundreds of megabits range.

Another object is to provide improved electrooptic crystals for use in high data rate laser communication systems.

Another object is to provide an improved electrooptic crystal construction for use in optical communication and like systems.

Another object is to provide improved electrooptic crystals capable of being excited electrically at relatively low level driver voltages.

Another object is to teach a process for treating crystals in such a manner that undesirable surface work strain is substantially relieved or eliminated.

Another object is to provide a process for improving the extinction ratio of electrooptic modulator crystals.

Another object is to teach a relatively simple process for treating crystals, which process substantially improves their performance characteristics.

Another object is to increase the operating range of crystal devices by minimizing certain strain limiting characteristics.

Another object is to provide more rugged crystal devices that are able to operate under more severe operating conditions than known crystals.

Other objects and many of the attendant advantages of this invention will be readily appreciated as the same are better understood by reference to the following detailed description in connection with the accompanying drawing wherein like reference numerals designate like parts and wherein.

Figure 4:
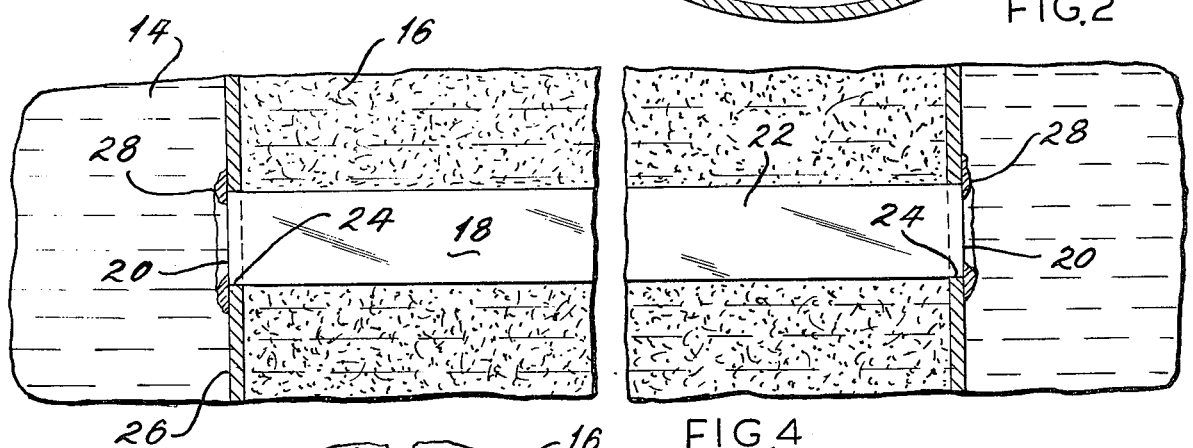
FIG. 4 is a sectional view taken on line 4—4 in FIG. 3.
Figure 3:
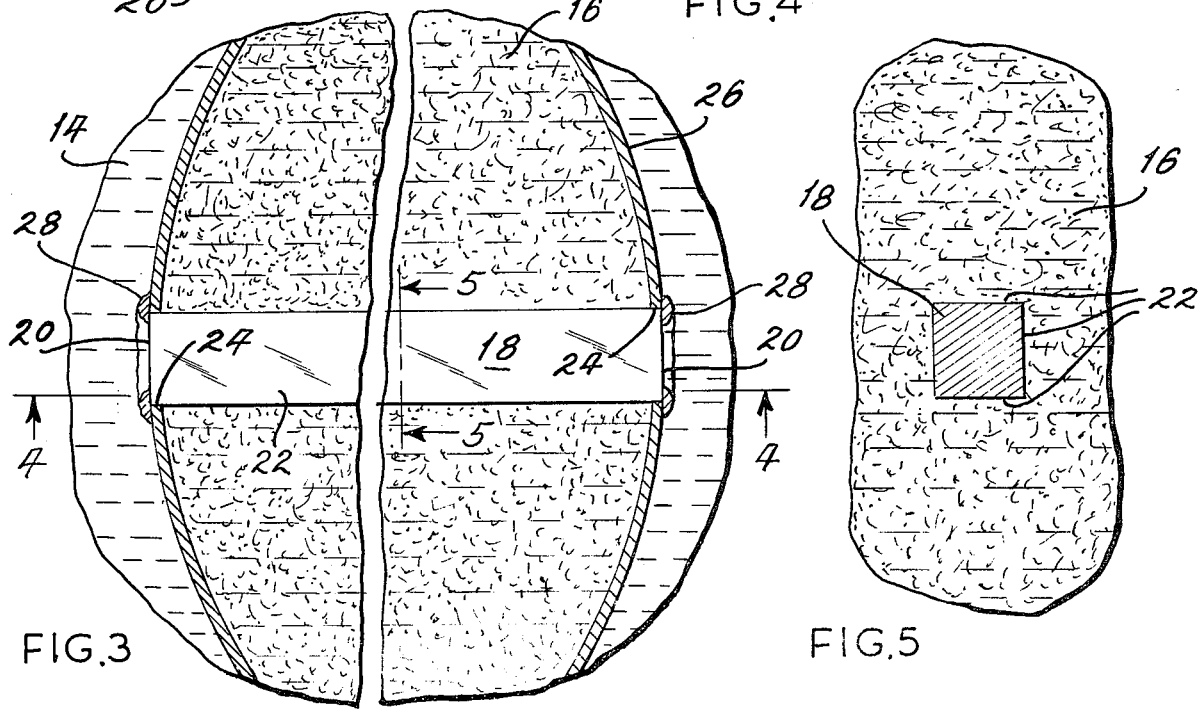
FIG. 3 is a greatly enlarged fragmentary cross-sectional view of the electrooptic crystal and the supporting tube therefor as shown in FIG. 2.
Figure 5:
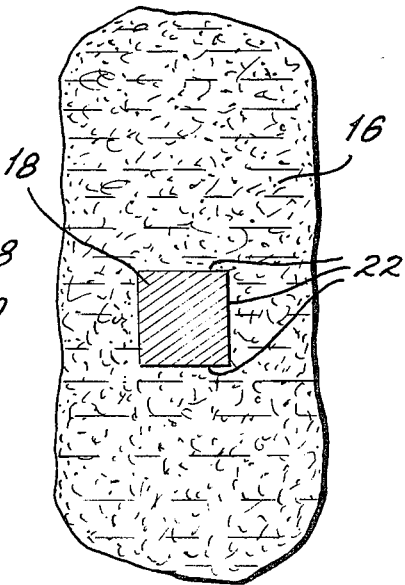
FIG. 5 is a cross-sectional view taken on line 5—5 in FIG. 4.

Referring to the drawings more particularly by reference numbers, number 10 refers to a tube partially immersed in a beaker 12 containing a neutralizing solution 14. The tube 10, as best seen in FIGS. 3–5, is partially filled with an etchant solution 16. Suspended extending across and through the tube 10 is an electrooptic crystal 18, best seen in FIGS. 3 and 4.

The crystal 18 is usually fabricated from a boule by a series of conventional cutting, grinding and polishing procedures such as those described in the following example. The boules are normally grown from melts by the Czochralsky technique, although other methods may be used and may be superior in some cases. The crystal 18 may be formed of a variety of electrooptic materials such as those described hereinafter.

The electrooptic crystal 18 has optically polished end faces or surfaces 20 and lateral side surfaces 22. The crystal 18 may have any suitable cross-sectional shape depending in part on the nature of the electrooptic material including the relative lengths and inclinations of the crystallographic axes. The lateral surfaces 22 of the crystal 18 tend to have undesirable work strain characteristics which are introduced during the conventional cutting and polishing operations, and these characteristics adversely affect certain of the optical properties and limit the usefulness of the crystal. In order to reduce or eliminate these undesirable characteristics and improve the operating characteristics, the lateral surfaces 22 are etched while the polished end faces 20 at the same time are protected by suitable means as described hereinafter.

To protect the polished end faces 20, the end portions of the crystal 18 adjacent the polished end surfaces are passed through aligned holes or apertures 24 formed in side walls 26 (shown as opposing sides) of the tube 10. To be particularly suitable for the purpose intended, it is preferred that the tube walls 26 be formed with a material that is resistant to or substantially unaffected by the etchant solution 16 and the neutralizing solution 14.

Although the tube 10 may be formed of polyvinyl chloride as well as many other materials having the abovementioned characteristics, it is preferred that it be made of a substance such as TEFLON because tubes made of this material are slightly resilient. To take advantage of the resiliency of the tube 10 and to minimize the amount of the lateral surfaces 22 that are not exposed to the etchant 16, the TEFLON tube 10 is preferably thin walled and has an outside diameter which is substantially the same as the length of the crystal 18. In mounting the crystal 18 in a position extending across the tube 10, the tube is slightly compressed and the crystal 18 is passed through the aligned holes 24. The pressure on the tube is then released and thus the crystal is positioned so that substantially none of the lateral surfaces 22 extends beyond the outside of the tube walls 26.

With the electrooptic crystal 18 mounted with its lateral surfaces 22 preferably not extending beyond the tube walls 26, protective layers or collars 28 are applied around the periphery of the polished end surfaces 20. The collars 28 are comprised of material which is resistant to the etchant solution 16 and to the neutralizing solution 14. It is also important that the material selected for the collars 28 be fluidizable for application to the polished end surfaces and that it be easily removable therefrom. Ordinarily, this requirement means that the protective material must be easily fluidized as by melting or by the use of an appropriate volatile solvent and that the protective material, furthermore, be soluble in suitable solvents for removal. Furthermore, the material must not melt or decompose at the temperature at which the etching process is conducted. Particularly suitable materials for this purpose are waxes, shellacs and like substances.

After the protective material is applied to the end surfaces 20 in a fluidized state, it is allowed to solidify by cooling or by the evaporation of the solvent, depending on whether the material is made fluid by melting or by use of selected solvents. The majority of the protective material is then selectively removed by means of a solvent leaving the collars 28 in place. The solvent, in addition to solubilizing the protective material must also be substantially inert towards the electrooptic material of which the crystal 18 is composed. As shown in FIGS. 3 and 4, the collars 28 may partially extend over the end surfaces 20. The amount of overlap is preferably minimized while still maintaining the seal between the ends of the crystal 18 and the holes 24. This is so because the etchant solution 16 tends to flow under the collars and along strain lines in the crystal and may tend to score the polished end surfaces thereof, thus damaging this portion of the optically polished faces.

With the electrooptic crystal 18 mounted as shown in FIGS. 3 and 4 the lateral surfaces 22 are immersed and in contact with the selected etchant solution 16. When the electrooptic material is lithium tantalate, suitable etchants 16 include hydrofluoric acid or a combination of hydrofluoric acid and some other mineral acid such as sulfuric acid, hydrochloric acid, phosphoric acid, pyrophosphoric acid, nitric acid or the like. In most cases, however, it is preferred to use hydrofluoric acid or a combination of hydrofluoric acid and sulfuric acid.

Other suitable electrooptic materials for crystal 18 include other electrooptic tantalates and niobates. Suitable niobates include, but are not limited to the following, lithium niobate, strontium barium niobate and barium sodium niobate. Perhaps more unusual, but nonetheless suitable, electrooptic tantalates and niobates include for example barium tantalate, calcium pyroniobate, lead niobate, lead tantalate, potassium niobate, potassium tantalate, potassium tantalate niobate, sodium niobate, strontium tantalate and the like. Suitable etchants 16 for these electrooptic tantalates and niobates, like lithium tantalate, include hydrofluoric acid or a combination of hydrofluoric acid and a mineral acid like sulfuric acid. When the electrooptic material is lithium niobate, strontium barium niobate or barium sodium niobate, for example, the etching takes place faster than with lithium tantalate under comparable conditions.

The crystal 18 may also be formed of electrooptic materials other than the electrooptic tantalates and niobates. For example, the crystal 18 may be an electrooptic phosphate such as potassium dihydrogen phosphate or its deuterated isomorphs, e.g. potassium dideuterium phosphate. Other, perhaps less common, electrooptic phosphates such as ammonium dihydrogen phosphate, rubidium dihydrogen phosphate and the like are also suitable electrooptic materials. When the electrooptic material is an electrooptic phosphate such as those listed above, a suitable etchant 16 is water.

The crystal 18 may also be formed of electrooptic materials other than those described above. Depending upon the selection of electrooptic material, the choice of suitable etchants 16 will readily be made by those skilled in the art.

In practice, it is preferred that the tube 10 with the crystal 18 mounted thereacross by partially immersed in the neutralizing solution as shown. The purpose of the neutralizing solution 14 is to further protect the polished end surfaces 20 during the etching process. That is, any escaping etchant solution 16 is promptly neutralized upon contact with the neutralizing solution 14 before it can come in contact with and cause substantial damage to the polished end surfaces 20. It will be readily apparent that the neutralizing solution selected must also be chosen so that it does not damage the exposed optically polished end surfaces 20. For reasons of effectiveness and relative noncausticity, a dilute solution of sodium carbonate is usually used as the neutralizing solution 14 when the etchant solution 16 is hydrofluoric acid or a combination of hydrofluoric acid and a mineral acid, but other materials capable of neutralizing the etching action of the etchant 16 may also be used for this purpose. For example, other suitable neutralizing materials include ammonium hydroxide, sodium hydroxide or the like.

As will be readily appreciated by one skilled in the art, the time necessary to etch the lateral surfaces 22 of the electrooptic modulator crystal 18 depends on the chemical nature of the electrooptic material, the concentration and nature of the etchant 16, the temperature at which the etching process is conducted, the type and depth of the work strained layer as described below and on other similar factors. In the etching process, the disturbed or strained layer along the lateral surfaces 22 is removed. Although the nature of this layer is not entirely understood, at present it is believed to be partly the result of plastic deformation of the crystal surface or region adjacent thereto and partly the result of debris left on the crystal surface as a result of the cutting and grinding procedures. This debris may perhaps include shattered particles of crystal and embedded fragments of grinding compound. In any case, even a partial removal of the work strained layer will improve the extinction ratio and other properties of the crystal 18. It is preferred, however, to allow the etching to continue until substantially all of the strained layer is removed. Accordingly, the depth of the etch is usually allowed to proceed to a few times the diameter of the largest abrasive particles used to grind the lateral surfaces 22. For example, when the electrooptic crystal is formed of lithium tantalate, the diameter of the grinding powder is usually less than about 25 microns; hence, the average depth of the etch is preferably between about 50 and about 75 microns. As aforementioned, the time necessary to accomplish this depth of etch depends upon various chemical, physical or other conditions. In a typical case using concentrated hydrofluoric acid (about 40 to 50 percent by weight hydrogen fluoride) as the etchant 16 and lithium tantalate as the electrooptic material, a desired average depth of etch (about 75 microns) was achieved in about 14 hours at a temperature of about 50° C. When the electrooptic material is lithium niobate, strontium barium niobate or barium sodium niobate, this same average depth of etch is accomplished more quickly than with lithium tantalate. Therefore, the etching is usually conducted at about 25° C. thereby providing a controlled etching which removes about 75 microns of material in about 8 hours.

When the etching process is completed, the electrooptic modulator crystal 18, mounted in the tube 10, is removed from the neutralizing solution 14 and the etchant 16 is drained from the tube. The collars 28 are then preferably removed by means of a solvent and the etched crystal is removed from the tube 10. While the process has been illustrated with one crystal 18, it is apparent that many crystals can be simultaneously, similarly treated and improved with little or no extra effort. Also, it may in some cases be advantageous to change the etchant solution 16 during the etching process thereby facilitating a more rapid completion of the process.

Improved electrooptic crystals produced by the above described process may be used for various purposes and applications. It should be noted in this connection, however, that crystals formed of the various types of electrooptic materials and treated as described herein have inherent unique characteristics including, for example, unique electrooptic coefficients, refractive indices, transmission characteristics, relative dielectric constants, loss tangents, and so forth. Hence, these distinctive properties should or must be taken into account in designing the systems in which they are used. Improved lithium tantalate electrooptic modulator crystals, such as are described in the following example, may be used in broadband, small aperture, high speed modulator configurations such as those shown in copending Rice et al. U.S. Pat. application Ser. No. 464,497, filed Apr. 26, 1974 entitled Broadband Electrooptical Modulator and assigned to Applicants' assignee. More particularly, the lithium tantalate electroptic modulator crystals described in the following example have demonstrated substantially improved extinction ratios in the order of about a thousand fold or even greater, thus providing crystals which are capable of operating at low driver voltages and at much higher data rates. This has made them especially useful in high data rate laser communication systems and in optical communication systems in general.

EXAMPLE

A crystal grown by the Czochralsky technique was formed from a congruent melt of lithium tantalate wherein the metal composition of the melt by weight was about 51 percent lithium and 49 percent tantalum. A boule approximately 10–15 centimeters in length and about 2–3 centimeters in diameter, with the longer dimension approximately corresponding to the crystallographic B axis, was pulled from the melt. Discs having a thickness of several millimeters were cut from the boule and cuts along the C axis were made close to opposite sides of the disc. The face of the disc, referred to as the B-face, was optically polished. Since lithium tantalate is ferromagnetic, the optically polished disc was poled by the imposition of a field at least instantaneously in a direction which includes at least a component of the crystallographic C axis at a temperature somewhat below the curie temperature.

The crystallographic axes of the disc prepared as described above were determined exactly and cuts were made along the A and C axes by means of a diamond slicing machine. The resulting slabs were about 1 centimeter along the B axis, about 0.5 millimeters along the C axis and several millimeters along the A axis. The slabs were then coarse ground on the C-faces. In practice, one C-face was ground until the desired matt surface had been obtained. The grinding powder for this purpose is preferably diamond dust wherein the diameter of the coarsest particle is about 25 microns. After the first C-face was ground the crystal was turned over and ground on the opposite C-face until a slab of the desired thickness had been obtained. Preferably, when the electrooptic crystal is formed from lithium tantalate the slab has a thickness from about 0.2 millimeters to about 0.3 millimeters. In this connection, in some cases it may be preferable to not grind the C-faces parallel to each other. This is because the necessary driver field is related to the thickness of the crystal; therefore, it is advantageous to remove excess crystal from those areas where the laser beam is more closely focused. This occurs in many devices especially those that use pairs of optically aligned similar crystals as in the afore-mentioned patent application.

The slab prepared as above was then cut into thin sections from about 0.2 millimeters to about 0.3 millimeters along the B axis, thus providing a crystal which was ground on two opposing lateral surfaces and cut on the other two. Usually, the cut surfaces are then ground with grinding powder as described above. The resulting electrooptic modulator crystal, while capable of switching at a voltage level of about 25–30 volts at the 50 Ω impedance level was found to have an extinction ratio of about 10 decibels (10:1) and, as such, was unsuitable for use at high data rates, e.g. 500 megabits per second. This low extinction ratio is believed to be the result of surface work strain. In this connection, it is possible that the work strain resulting from the above-described cutting and polishing is not uniform over all of the lateral surfaces. This is because, as indicated above, two of the surfaces are ground before the final cutting and two are ground after the final cutting.

Figure 1:
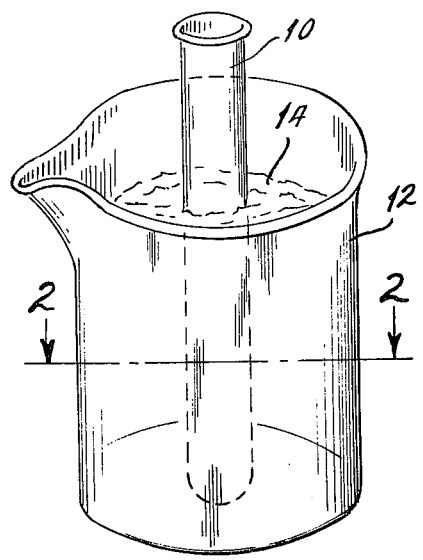
FIG. 1 is a perspective view showing a tube containing an etchant solution partially immersed in a beaker containing a neutralizing solution.
Figure 2:
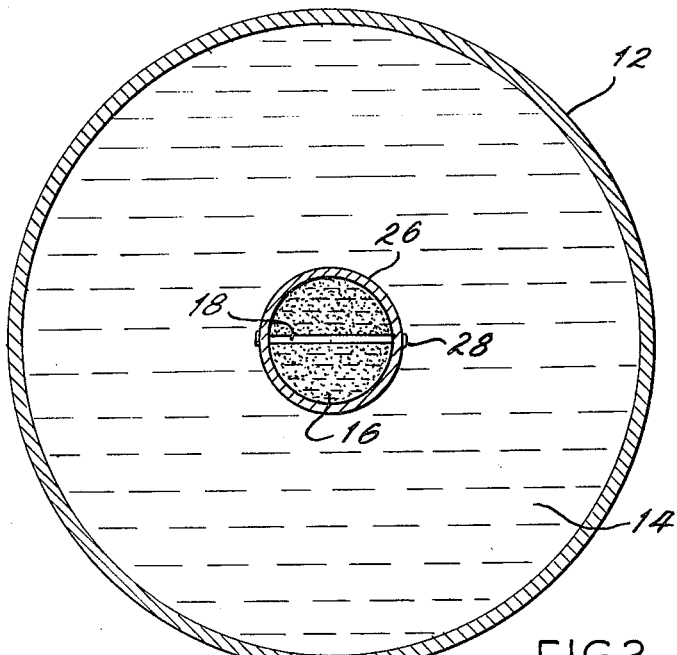
FIG. 2 is an enlarged cross-sectional view taken on line 2—2 in FIG. 1 showing an electrooptic crystal supported extending across the tube.

To improve the extinction ratio and to remove the work strained layer along all of the lateral surfaces, the electrooptic crystal was prepared for etching. To this end, the electrooptic crystal, which was very brittle and fragile, was positioned extending across a tube formed of TEFLON. As shown in FIG. 2, the optically polished end surfaces extended to the outside of the tube, through the walls thereof as shown. The optically polished end surfaces were then coated with a solution of wax in acetone. The solvent was allowed to evaporate and then the excess wax was washed away from the optically polished surfaces wiith additional acetone, thereby leaving collars around the periphery of the optically polished surfaces at the ends of the crystal. With the electrooptic crystal in place, the TEFLON tube was filled with concentrated hydrofluoric acid and the tube was then immersed in a neutralizing bath comprising an aqueous solution of sodium carbonate.

During the etching process which was allowed to continue for about 14 hours at a temperature of 50° C., the etching solution was changed from time to time. At the end of this 14 hours the depth of the etch was found to be 2–3 times the diameter of the largest abrasive particles used to grind the lateral crystal surfaces. At other temperatures, this depth would have been reached more or less quickly depending somewhat on the temperature selected.

At the conclusion of the etching process, the TEFLON tube was removed from the neutralizing bath, the etching solution was drained from the tube, the protective collars were removed from the periphery of the optically polished end faces with acetone and the work strain relieved crystal was then removed from the tube. The resulting crystal was found to have a substantially improved extinction ratio of about 40 decibels (10,000:1) as compared to about 10 decibels (10:1) before etching. This improved electrooptic modulator crystal, unlike the untreated crystal, was suitable for use with broadband, solid state modulator driver amplifiers (> 100 MHz), such as those described in the above-mentioned copending application. As such, the improved electrooptic crystal was capable of switching at the relatively low output voltage of the driver (25–30 volts at a 50 Ω impedance level) and of operating at much higher data rates in the order of several hundred megabits per second, e.g. 500 Mbps. and higher. Hence, the improved crystal makes possible space qualifiable, high speed laser communication systems using crystal controlled modulators and demodulators or the like.

The beneficial results of the procedures described herein have been particularly described with respect to electrooptic modulator crystals wherein the electrooptic material is lithium tantalate; however, comparable results are obtained with strontium niobate and other electrooptic materials including those mentioned above. Hence, it is not intended to limit the present invention to any particular electrooptic crystal substance.

It is apparent from the foregoing that there has been provided in accordance with the invention an improved electrooptic modulator crystal and process for producing same that fully satisfies the objects, aims and advantages set forth above. While the invention has been described in conjunction with specific embodiments and processes it is evident that many changes, alternatives, modifications and variations as well as other end uses therefor will be apparent to those skilled in the art in light of the foregoing description. For example, the subject improved electrooptic crystals can be used both as active and as passive optical devices. That is, the improved crystals are useful not only in optical devices with associated means for applying an electrical signal for some purpose, such as to change the polarization of an optical signal passing therethrough, but also in passive optical devices useful for other optical purposes wherein there is ordinarily no associated electric field but wherein the crystal transmission properties may be modified in some other way such as by optical or magnetic means or by applied external stress and wherein those properties at the same time will interact in some specified manner with the optical beam. Other such changes, alternatives, modifications and variations in the invention and in its end use will be readily apparent to those skilled in the art and it is intended to embrace all such changes, alternatives, modifications and variations as fall within the spirit and broad scope of the subjoined claims.

What is claimed is:

1. A process for improving the operating characteristics of an electrooptic crystal which process comprises mounting the crystal in a tubular support member with the crystal extending across the inside and from opposite sides thereof, surrounding the circumferential end portions with a protective substance to protect the optically polished crystal end surfaces to prevent etching while simultaneously exposing the lateral surfaces of the crystal which extend across the inside of the tubular support member to an etchant so that surface work strain resulting from the cutting and polishing of the lateral surfaces is reduced, such exposure being maintained for sufficient time to etch away a minimal depth approximately equal to a few times the diameter of the largest abrasive particles used to form said lateral surfaces.

2. The process of claim 1 wherein the electrooptic crystal is formed from an electrooptic material selected from the group consisting of electrooptic tantalates and electrooptic niobates and the etchant is selected from the group consisting of hydrofluoric acid and a combination of hydrofluoric acid and a mineral acid.

3. The process of claim 1 wherein the electrooptic crystal is formed from an electrooptic tantalate selected from the group consisting of lithium tantalate, barium tantalate, lead tantalate, potassium tantalate and strontium tantalate.

4. The process of claim 1 wherein the electrooptic crystal is formed from an electrooptic niobate selected from the group consisting of barium sodium niobate, strontium barium niobate, calcium pyroniobate, lead niobate, lithium niobate, potassium niobate, potassium tantalate niobate and sodium niobate.

5. The process of claim 1 wherein the electrooptic crystal is formed from an electrooptic phosphate and the etchant is water.

6. The process of claim 1 wherein the electrooptic crystal is formed from an electrooptic phosphate selected from the group consisting of ammonium dihydrogen phosphate, potassium dihydrogen phosphate, rubidium dihydrogen phosphate and the deuterated isomorphs of said electrooptic phosphates.

7. A process for improving the operating characteristics including the extinction ratio of an electrooptic crystal which is formed from an electrooptic material, said crystal being formed as an elongated member having lateral side surfaces and spaced optically polished end faces, the process comprising the following sequential steps:

a. mounting the crystal in wall means which physically separate the polished end faces from the lateral side surfaces, b. exposing the lateral side surfaces to an etchant substance capable of etching said side surfaces while simultaneously exposing the polished end faces to a substance capable of neutralizing the etching action of the etchant substance, c. maintaining the lateral side surfaces exposed to said etchant substance for sufficient time to etch away a minimal predetermined surface portion of the crystal approximately equal to a few times the diameter of the largest abrasive particles used to form said side surfaces, and d. removing the crystal from exposure to the etchant substance and the substance capable of neutralizing said etchant substance.

8. The process of claim 7 wherein the wall means include a tubular member constructed of a substance which is substantially unaffected by the etchant substance and the neutralizing substance.

9. The process of claim 7 wherein the crystal is formed of an electrooptic material selected from the group consisting of electrooptic tantalates, electrooptic niobates and electrooptic phosphates.

10. The process of claim 7 which further somprises the step of applying a protective substance between the crystal and the wall means to sealably separate the lateral side surfaces from the polished end faces before the crystal is exposed to the etchant substance and the neutralizing substance.

11. The process of claim 7 wherein the etchant substance is selected from the group consisting of hydrofluoric acid and a combination of hydrofluoric acid and a mineral acid when the crystal is formed of an electrooptic tantalate or an electrooptic niobate and wherein the etchant is water when the crystal is formed of an electrooptic phosphate.

12. The process of claim 8 wherein the tubular member is constructed of a material selected from the group consisting of polytetrafluoroethylene and polyvinyl chloride.

13. The process of claim 7 wherein one of the crystallographic axes of the crystal extends longitudinally between the polished end faces.

14. The process of claim 7 wherein the crystal is tapered so that the cross-section of the crystal is greater adjacent to one of the optically polished end faces than the other.

15. A process for improving the operating characteristics including the extinction ratio of electrooptic crystals formed from an electrooptic material selected from the group consisting of electrooptic tantalates and electrooptic niobates, said crystals having lateral surfaces and optically polished end surfaces, said process comprising supporting the crystal in a tubular support member with the lateral crystal surfaces extending across the interior of the support member and the polished end surfaces being exposed on the outside of the support member, bathing the optically polished end surfaces with a neutralizing solution while simultaneously etching the lateral surfaces with an etchant contained within the support member and selected from the group consisting of hydrofluoric acid and a combination of hydrofluoric acid and another mineral acid so that surface work strain associated with the lateral surfaces of the crystal is reduced.

16. The process of claim 15 wherein the etching proceeds to a depth substantially equal to a distance from about 2 to about 3 times the diameter of the largest particles used to grind the lateral surfaces of the crystal.

17. A process for improving characteristics including the extinction ratio of lithium tantalate electrooptic crystals having lateral surfaces and spaced optically polished end surfaces which comprises forming a pair of aligned openings in the sides of a tube, said openings being sufficiently large to receive said crystal, passing the crystal through the pair of aligned openings so that substantially none of the lateral surfaces are outside of the tube, positioning the cyrstal so that the crystal is supported by the tube and so that the optically polished end surfaces are outside of the tube, filling the tube with an etchant selected from the group consisting of hydrofluoric acid and a combination of hydrofluoric acid and a mineral acid and simultaneously immersing the tube in a neutralizing solution so that the optically polished end surfaces are bathed with said neutralizing solution, maintaining said condition until the etchant has etched away a minimal amount of material from the lateral surfaces of the crystal approximately equal to a few times the diameter of the largest abrasive particles used to cut said side surfaces, said tube being constructed of a material resistant to both the etchant solution and the neutralizing solution.

18. The process of claim 17 wherein the etching takes place at a temperature of about 50° C.

19. The process of claim 18 wherein the etching is completed in about 14 hours.

20. The process of claim 17 wherein the neutralizing solution is an aqueous solution of a basic material selected from the group consisting of sodium carbonate, ammonium hydroxide and sodium hydroxide.

21. A process for improving the operating characteristics including the extinction ratio of lithium tantalate electrooptic modulator crystals having lateral surfaces which have been polished with grinding compound and optically polished end surfaces, said crystals having mutually perpendicular crystallographic A, B and C axes and having dimensions from about 0.2 mm. to about 0.3 mm. along the A and C axes and about 1 cm. along the B axis, said process comprising forming a pair of aligned openings in a thin walled tube formed from polytetrafluoroethylene, passing the crystal through the aligned openings so that substantially none of the lateral surfaces of the crystal are outside of the tube, positioning the crystal in the holes so that the crystal is supported by the tube and so that the optically polished end surfaces are outside of the tube, applying a protective collar between the crystal and the tube so that the openings are sealed around the crystal, filling the tube with an etchant substance selected from the group consisting of hydrofluoric acid and a combination of hydrofluoric acid and another mineral acid while simultaneously immersing the tube in a neutralizing solution so that the optically polished end surfaces are bathed by the neutralizing solution during the etching of the lateral surfaces, said etching continuing until an average of about 50 to about 75 microns of material has been removed from the lateral surfaces of the crystal.

22. The process of claim 21 wherein the etching is completed in about 14 hours at 50° C.

23. The process of claim 21 wherein the neutralizing solution is a dilute solution of sodium carbonate.

24. The process of claim 21 which further comprises the steps of renewing the etching solution during the etching process.

25. Improved electrooptic modulator crystals produced in accordance with the process of claim 1.

26. Improved electrooptic modulator crystals produced in accordance with the process of claim 21.

27. Improved electrooptic modulator crystal produced in accordance with the process of claim 3.

28. Improved electrooptic modulator crystal produced in accordance with the process of claim 4.

29. Improved electrooptic modulator crystal produced in accordance with the process of claim 6.

* * * * *